United States Patent
Dobrinin (10) Patent No.: US 11,916,994 B1
(45) Date of Patent: Feb. 27, 2024

(54) EXTENDING RESTFUL WEB SERVICE RESOURCES IN A JAVA-COMPONENT-DRIVEN-ARCHITECTURE APPLICATION

(71) Applicant: JDA Software Group, Inc., Scottsdale, AZ (US)

(72) Inventor: Mikhail V. Dobrinin, Glendale, WI (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 128 days.

(21) Appl. No.: 15/841,633

(22) Filed: Dec. 14, 2017

Related U.S. Application Data (60) Provisional application No. 62/434,843, filed on Dec. 15, 2016.

(51) Int. Cl.
*H04L 67/02* (2022.01)
*G06F 8/30* (2018.01)
*G06F 9/445* (2018.01)
*H04L 67/10* (2022.01)
*G06F 16/95* (2019.01)

(52) U.S. Cl.
CPC .............. *H04L 67/02* (2013.01); *G06F 8/315* (2013.01); *G06F 9/44505* (2013.01); *G06F 16/95* (2019.01); *H04L 67/10* (2013.01)

(58) Field of Classification Search
CPC ......... H04L 67/02; H04L 67/10; H04L 45/00; G06F 16/95; G06F 8/315; G06F 9/44505; G06F 9/45558; G06F 2009/45595; G06F 2009/45591
See application file for complete search history.

(56) References Cited

U.S. PATENT DOCUMENTS

| | | | | |
|---|---|---|---|---|
| 2002/0032768 A1* | 3/2002 | Voskuil | ...................... | G06F 8/60 709/224 |
| 2003/0046681 A1* | 3/2003 | Barturen | ................... | G06F 8/71 717/177 |
| 2003/0074634 A1* | 4/2003 | Emmelmann | ....... | H04L 67/2823 715/255 |
| 2003/0204645 A1* | 10/2003 | Sharma | ...................... | G06F 8/10 719/328 |
| 2007/0106984 A1* | 5/2007 | Birk Olsen | ............... | G06F 8/61 717/174 |

(Continued)

OTHER PUBLICATIONS

Customizing an existing configuration-based data bean mapping to return more date. IBM Knowledge Center. http://www.ibm.com/support/knowledgecenter/SSZLC2_7.0.0/com.ibm.commerce.webservices.doc/tutorial/twv_restconfig5.htm 4 pages.

*Primary Examiner* — Hitesh Patel
(74) *Attorney, Agent, or Firm* — Spencer Fane LLP; Steven J. Laureanti (57) ABSTRACT

A system and method are disclosed for an application server having one or more web application archives and one or more endpoints, determining whether a functionality of one or more endpoints is to be changed, and responsive to the determination of whether an endpoint of the one or more endpoints is to be changed, determining a link to a functionality component located external to the one or more web application archive that is to replace the functionality of the endpoint, and causing the external functionality component to link to the endpoint.

14 Claims, 3 Drawing Sheets

(56) References Cited

U.S. PATENT DOCUMENTS

| | | | |
|---|---|---|---|
| 2008/0162621 A1* | 7/2008 | Schulz | G06F 8/65 709/201 |
| 2008/0201568 A1* | 8/2008 | Quinn | G06F 9/44521 713/1 |
| 2008/0235180 A1* | 9/2008 | Anand | G06F 16/283 |
| 2009/0006416 A1* | 1/2009 | Krahulec | G06F 16/972 |
| 2009/0222504 A1* | 9/2009 | Vandanapu | G06F 8/61 709/201 |
| 2009/0328017 A1* | 12/2009 | Larsen | G06F 9/449 717/146 |
| 2011/0154441 A1* | 6/2011 | Oh | G06F 8/20 726/3 |
| 2012/0123898 A1* | 5/2012 | Kirkeby | G06Q 30/0631 705/26.7 |
| 2012/0166992 A1* | 6/2012 | Huynh | H04L 67/10 715/771 |
| 2012/0254362 A1* | 10/2012 | Li | H04W 12/03 709/218 |
| 2013/0332660 A1* | 12/2013 | Talagala | G06F 12/0246 711/103 |
| 2014/0053167 A1* | 2/2014 | Zhang | G06F 9/45533 719/328 |
| 2014/0075322 A1* | 3/2014 | Delano | H04L 41/22 715/736 |
| 2014/0122729 A1* | 5/2014 | Hon | H04N 1/00127 709/228 |
| 2014/0156828 A1* | 6/2014 | Pasternak | G06F 8/36 709/224 |
| 2014/0208153 A1* | 7/2014 | Havemose | G06F 11/1482 714/4.11 |
| 2014/0280484 A1* | 9/2014 | Klemenz | H04L 67/02 709/203 |
| 2014/0282400 A1* | 9/2014 | Moorthi | G06F 8/71 717/122 |
| 2015/0040112 A1* | 2/2015 | Valencia | G06F 8/36 717/168 |
| 2015/0127717 A1* | 5/2015 | Teibel | H04L 67/10 709/203 |
| 2015/0134729 A1* | 5/2015 | Lim | H04L 67/02 709/203 |
| 2015/0193324 A1* | 7/2015 | McGrath | H04L 67/10 717/127 |
| 2015/0277971 A1* | 10/2015 | Young, III | G06F 9/44521 713/100 |
| 2015/0312323 A1* | 10/2015 | Peterson | H04W 4/50 709/203 |
| 2015/0319252 A1* | 11/2015 | Momchilov | H04L 67/146 709/223 |
| 2017/0097842 A1* | 4/2017 | Bugenhagen | G06F 13/102 |
| 2017/0118095 A1* | 4/2017 | Konecny | H04L 67/02 |
| 2019/0356697 A1* | 11/2019 | Chougule | G06F 9/45558 |
| 2020/0241949 A1* | 7/2020 | Basu | G06F 11/0775 |
| 2020/0404359 A1* | 12/2020 | Boinus | H04N 21/437 |

* cited by examiner

EXTENDING RESTFUL WEB SERVICE RESOURCES IN A JAVA-COMPONENT-DRIVEN-ARCHITECTURE APPLICATION

CROSS-REFERENCE TO RELATED APPLICATIONS

The present disclosure is related to that disclosed in the U.S. Provisional Application No. 62/434,843, filed Dec. 15, 2016, entitled "Extending RESTful Web Service Resources in a JAVA Component Driven Architecture Application." U.S. Provisional Application No. 62/434,843 is assigned to the assignee of the present application. The subject matter disclosed in U.S. Provisional Application No. 62/434,843 is hereby incorporated by reference into the present disclosure as if fully set forth herein. The present invention hereby claims priority under 35 U.S.C. § 119(e) to U.S. Provisional Application No. 62/434,843.

TECHNICAL FIELD

The present disclosure relates generally to web services and specifically to extending representational state transfer web service resources in a JAVA component driven architecture application.

BACKGROUND

Software customers in the supply chain sector often need to customize software products to fit the particular needs of their business. Customizing software however requires access to a software's source code. Because the source code is proprietary to the software implementer, most customers will not have access to it. To address this issue, the software implementers must customize the software by writing code specific to many customers, which requires many back-and-forth multi-level conversations between the customer and the software implementer to design the customizations negotiate new contracts, and which results in many versions of each software program. These limitations are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

According to embodiments, embodiments of the current disclosure comprise a framework for injecting custom functionality into an application server to expose it as a representational state transfer (RESTful) web service. Supply chain entities (such as retailers, manufacturers, distribution centers, suppliers, and the like) manage supply chain actions using systems comprising computers and software applications. However, supply chain entities across different enterprises (and frequently even supply chain entities in the same enterprise) organize and manage their businesses different enough that the applications that manage supply chain processes must be customized for many, if not most, deployments. For example, warehouse management operations are organized and run differently depending on the particular entity in charge. A first supply chain entity may have a single department attribute for items in the warehouse inventory, for example lipstick belonging to the cosmetics department. A second supply chain entity may operate by marking inventory with a standard department attribute, as well as a more specific sub-department attribute. To deal with even this seemingly small difference, the application that manages item inventory data must be customized to understand the new sub-department attribute. Importantly, it must be able to relay the new sub-department attribute to any clients, which can be achieved by customizing the endpoint. According to a further example, a third supply chain entity may have a need to integrate with a warehouse management system (WMS) wherein the supply chain entity's software is acting as a client to the server warehouse management system (WMS). In this example, if the client is able to understand data in JSON format, but the server is only able to provide data in XML format, the WMS system's endpoints may be customized to provide data in a JSON format to solve the incompatibility.

According to an aspect, embodiments of the disclosed framework provide for customizing the functionalities of an application server without drastically rewriting the code for the application and/or the specific application domain services. Additionally, this framework allows a service to be compiled and linked to existing services, without recompiling the existing services. According to some embodiments, an application employs the disclosed framework to add, remove, or change functionalities of one or more endpoints regardless of the programming language employed.

Figure 1:
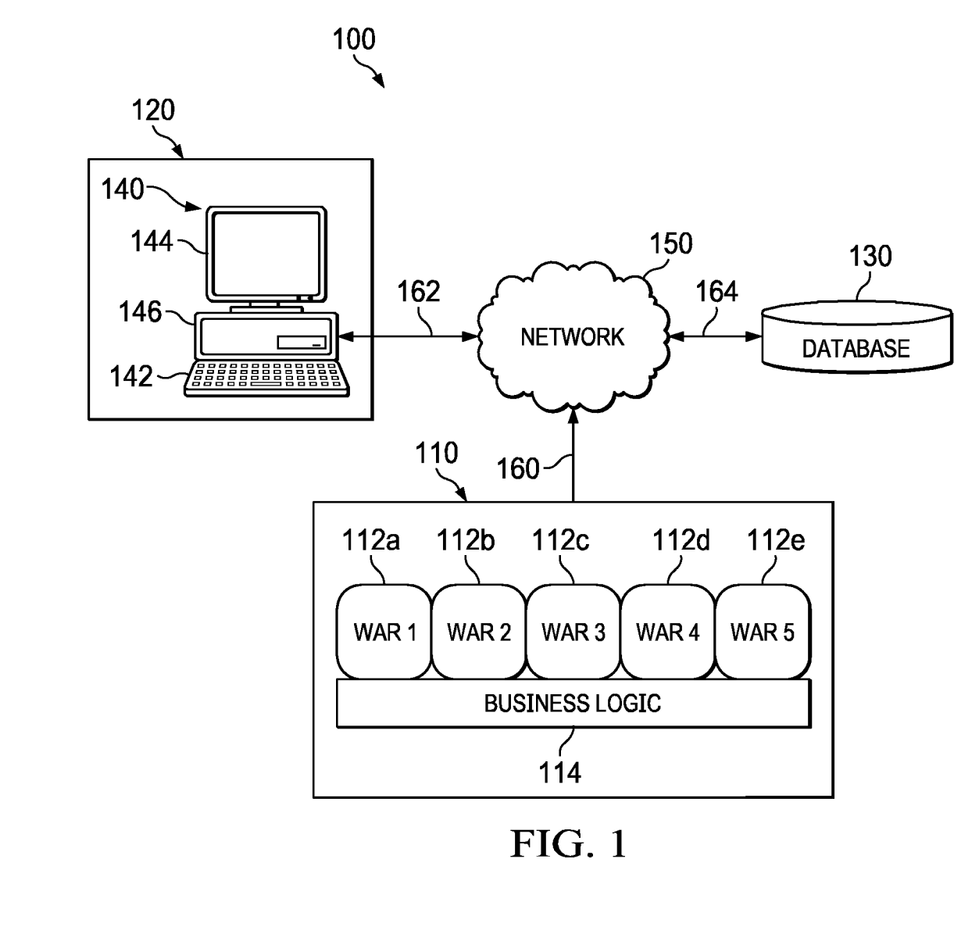
FIG. 1 illustrates an exemplary system, according to an embodiment.

FIG. 1 illustrates an exemplary system 100 according to an embodiment. System 100 comprises application server 110, client 120, database 130, computer 140, network 150, and communication links 160-162. Although a single application server 110, a single client 120, a single database 130, a single computer 140, and a single network 150, are shown and described, embodiments contemplate any number of servers, clients, databases, or networks, according to particular needs.

According to embodiments, application server 110 comprises an application server hosting one or more web application archives (WARs) 112a-112e supported by business logic 114 and which provide one or more services to client 120. One or more WARs 112a-112e may comprise a first WAR (WAR1) 112a, a second WAR (WAR2) 112b, a third WAR (WAR3) 112c, a fourth WAR (WAR4) 112d, and a fifth WAR (WAR5) 112e. According to embodiments, one or more WARs 112a-112e comprise an indivisible block of JAVA Virtual Machine (JVM) bytecode (i.e., JVM languages such as, for example, JAVA, Groovy, KOTLIN, SCALA, and the like that are compiled into JVM bytecode) that represents a collection of functionalities and resources including but not limited to static HTML and JAVASCRIPT files. Each of the one or more WARs 112a-112e comprises one or more endpoints 202, each of which execute a specific method when called by client 120. As described in more detail below, endpoints 202 comprise an individual block of JVM bytecode that provide pieces of functionality, or features, that can be shared with client 120. Although application server 110 is illustrated as comprising five WARs 112a-112e, embodiments contemplate any number of WARs, according to particular needs.

WARs 112a-112e may be deployed on application server 110 and configured to enable the various functionalities required to operate the supply chain management (SCM) system, including other third-party supply chain system applications. For example, according to some embodiments, application server 110 includes one or more WARs 112a-112e that function as the input and output layers of an application which receive and respond to requests as described in more detail below. According to other embodiments, application server 110 includes one or more WARs 112a-112e and business logic 114 that together function as the input and output layers of an application while providing access to business rules. Different applications used to enable the various functions required to run the systems for operating one or more supply chain entities may be implemented according to these embodiments or others, according to particular needs. Additionally, application server 110 comprises any suitable number of computers, servers, or databases coupled with application server 110 to enable operation of supply chain systems.

According to embodiments, client 120 comprises software or hardware that accesses a service from server 120. According to some embodiments, client 120 comprises a thick client, such as, for example, a software application, compiled and running on computer 140. According to other embodiments, client 120 comprises a thin client, such as, for example, code executed by webpage within a web browser. According to some embodiments, client 120 comprises a hybrid client comprising features of both thick and thin clients. Regardless of the particular implementation, client 120 may comprise any software or hardware (such as, for example, a server, a computer 140, a scanner, or other hardware) configured to request information from application server 110 and/or capable of receiving information returned from application server 110 based on the request.

According to embodiments, client 120 may include, for example, one or more computers 140 programmed to communicate with application server 110 and, according to some embodiments, may be programmed to autonomously handle, among other things, communication with application server 110 and/or one or more related tasks within system 100. As an example only and not by way of limitation, client 120 may comprise a scanner used by one or more employees of a retailer, and application server 110 may comprise a warehouse management server of the same retailer. In this example, client 120, comprising the scanner, is programmed to communicate with application server 110 in response to a scan of a barcode of one or more products in a warehouse to, for example, indicate that a product is present at, arriving to, or leaving the warehouse. The scanner may, for example, be operated by an employee walking through the warehouse and scanning particular products. According to other embodiments, scanner may be fixably mounted and scans products as the products move past the scanner, such as by a conveyer belt or other product mover. Although a particular example comprising a warehouse management server is given, embodiments contemplate any sever 110 and client 120, according to particular needs.

Database 130 comprises application data (which may include endpoint data), component data, and resources data. Although the database is described as comprising application data, endpoint data, component data, and resources data, embodiments contemplate any suitable number or combination of these, located at one or more locations, local to, or remote from, application server 110, according to particular needs.

As shown in FIG. 1, system 100 comprising application server 110, client 120, and database 130 may operate on one or more computers 140 that are integral to or separate from the hardware and/or software that support application server 110, client 120, and database 130. Computers 140 may include any suitable input device 142, such as a keypad, mouse, touch screen, microphone, or other device to input information. Output device 144 may convey information associated with the operation of system 100, including digital or analog data, visual information, or audio information. Computer 140 may include fixed or removable computer-readable storage media, including a non-transitory computer readable medium, magnetic computer disks, flash drives, CD-ROM, in-memory device or other suitable media to receive output from and provide input to system 100.

Computer 140 may include one or more processors 146 and associated memory to execute instructions and manipulate information according to the operation of system 100 and any of the methods described herein. One or more processors 146 may execute an operating system program stored in memory to control the overall operation of computer 140. For example, one or more processors 146 control the reception and transmission of signals within the system. One or more processors 146 execute other processes and programs resident in memory, such as, for example, registration, identification or communication and moves data into or out of the memory, as required by an executing process. In addition, or as an alternative, embodiments contemplate executing the instructions on computer 140 that cause computer 140 to perform functions of the method. Further examples may also include articles of manufacture including tangible computer-readable media that have computer-readable instructions encoded thereon, and the instructions may comprise instructions to perform functions of the methods described herein.

In addition, and as discussed herein, system 100 may comprise a cloud-based computing system having processing and storage devices at one or more locations, local to, or remote from application server 110, client 120, and database 130. In addition, each of the one or more computers 140 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with the application server 110 and/or client 120. These one or more users may include, for example, an "employee" or a "planner" handling one or more related tasks within system 100. In addition, or as an alternative, these one or more users within the system may include, for example, one or more computers 140 programmed to autonomously handle, among other things, managing requests and responses between application server 110, client 120, database 130, and/or other components of system 100.

In one embodiment, application server 110 may be coupled with network 150 using communications link 160, which may be any wireline, wireless, or other link suitable to support data communications and communication protocols between application server 110 and network 150 during operation of system 100. Client 120 may be coupled with network 150 using communications link 162, which may be any wireline, wireless, or other link suitable to support data communications and communication protocols between client 120 and network 150 during operation of system 100. Database 130 may be coupled with network 150 using communications link 164, which may be any wireline, wireless, or other link suitable to support data communications and communication protocols between database 130 and network 150 during operation of system 100. Computer 140 may be coupled with network 150 using communications link 166, which may be any wireline, wireless, or other link suitable to support data communications and communication protocols between computer 140 and network 150 during operation of system 100. Although communication links 160-166 are shown as generally coupling application server 110, client 120, database 130, and computer 140 to network 150, any of application server 110, client 120, database 130, and computer 140 may communicate directly with each other, according to particular needs. According to particular embodiments and as described in more detail below, client 120 does not communicate directly with database 130, but, instead, communicates with server 110 which handles information requests for client 120 by querying database 130 and responding to client 120 based, at least in part, on the communication between server 110 and database 130.

In another embodiment, network 150 includes the Internet and any appropriate local area networks (LANs), metropolitan area networks (MANs), or wide area networks (WANs) coupling application server 110, client 120, database 130, and/or computer 140. For example, data may be maintained locally to, or externally of application server 110, client 120, database 130, and computer 140 and made available to one or more associated users of application server 110, client 120, database 130, and computer 140 using network 150 or in any other appropriate manner. For example, data may be maintained in a cloud database at one or more locations external to application server 110, client 120, database 130, and computer 140 and made available to one or more associated users of application server 110, client 120, database 130, and computer 140 using the cloud or in any other appropriate manner. For example, according to some embodiments, application server 110 may be hosted on a server or computer 140 residing internal to one or more supply chain entities. For example, application server 110 is deployed at a data center associated with the one or more supply chain entities and communicates with client 120 over an internal communication network of the one or more supply chain entities. According to a further example, application server 110 is deployed at a data center associated with the one or more supply chain entities and communicates with client 120 over an external communication network, such as the Internet.

According to other embodiments, application server 110 may comprise a cloud-based server which communicates with the one or more supply chain entities over a network at least partially external to the one or more supply chain entities, such as the Internet. For example, a cloud-based server may reside in a centralized data center external to the one or more supply chain entities and the one or more supply chain entities communicates through the cloud-based server over the Internet or another network 150 to client 120, which may be located internal to a data center of the one or more supply chain entities. Those skilled in the art will recognize that the complete structure and operation of network 150 and other components within system 100 are not depicted or described. Embodiments may be employed in conjunction with known communications networks and other components.

Figure 2:
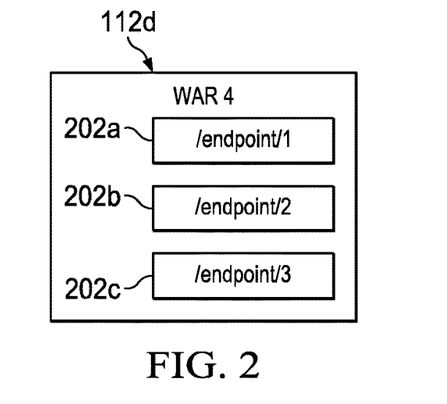
FIG. 2 illustrates the fourth web application archive (WAR4) of FIG. 1 in greater detail, according to an embodiment.

FIG. 2 illustrates WAR4 112d of FIG. 1 in greater detail, according to an embodiment. As discussed above, WAR4 112d comprises (1) an indivisible block of JVM bytecode that represents a collection of functionalities and (2) endpoints 202a-202c that comprise individual blocks of JVM bytecode and provide pieces of functionality or features that can be shared with client 120. Endpoints 202a-202c comprise /endpoint/1 (endpoint 1) 202a, /endpoint/2 (endpoint 2) 202b, and /endpoint/3 (endpoint 3) 202c. According to embodiments, when one of the endpoints 202a-202c is called, endpoints 202a-202c each execute a specific method inside WAR4. To further illustrate WAR4 112d and endpoints 202a-202c, an example is now given. In the following example, WAR4 112d may be associated with a warehouse management application, endpoint 1 202a may work with all or some of the current orders, endpoint 2 202b may work with all or some of the shipments, and endpoint 3 202c may work with all or some of the inventory stocked in the warehouse.

Additionally, endpoints 202a-202c are organized in a RESTful manner, which provides access and manipulation of resources using a uniform set of stateless operations. Continuing with the above example, a warehouse management application comprises many endpoints, (such as, for example, orders, shipments, inventory and the like) and the endpoints are organized in a RESTful manner such that each of the endpoints of the warehouse management application is associated with the warehouse resource with which it interacts. As an example only and not by way of limitation, based on the RESTful standard, an order endpoint 202a may be associated with an order resource. The interaction between the order endpoint 202a and the order resource comprises, for example, listing orders, creating a new order, deleting a previously created order, and/or the like.

Although, a particular application is described as a warehouse management application, WAR4 112d is described with three endpoints 202a-202c, and particular functions are associated with each of the endpoints 202a-202c, embodiments contemplate any type of application, any number or type of WARs 112, and any number and type of endpoints 202, according to particular needs. For example, in one embodiment, application server 110 comprises a single WAR 112 having hundreds or thousands of endpoints 202 within the single WAR 112. In other embodiments, application server 110 comprises multiple WAR modules, wherein each WAR module comprises one or more endpoints 202. As an example only and not by way of limitation, application server 110 comprising a warehouse management application may comprise three WARs 112, each of the WARs 112 with their own endpoints 202, where a first WAR 112a may be for warehouse-specific data, a second WAR 112b may be for transportation data, and a third WAR 112c may be for shipment data. In addition, or as an alternative, WARs 112 and/or endpoints 202 may be included based on the type or size of the application.

Figure 3:
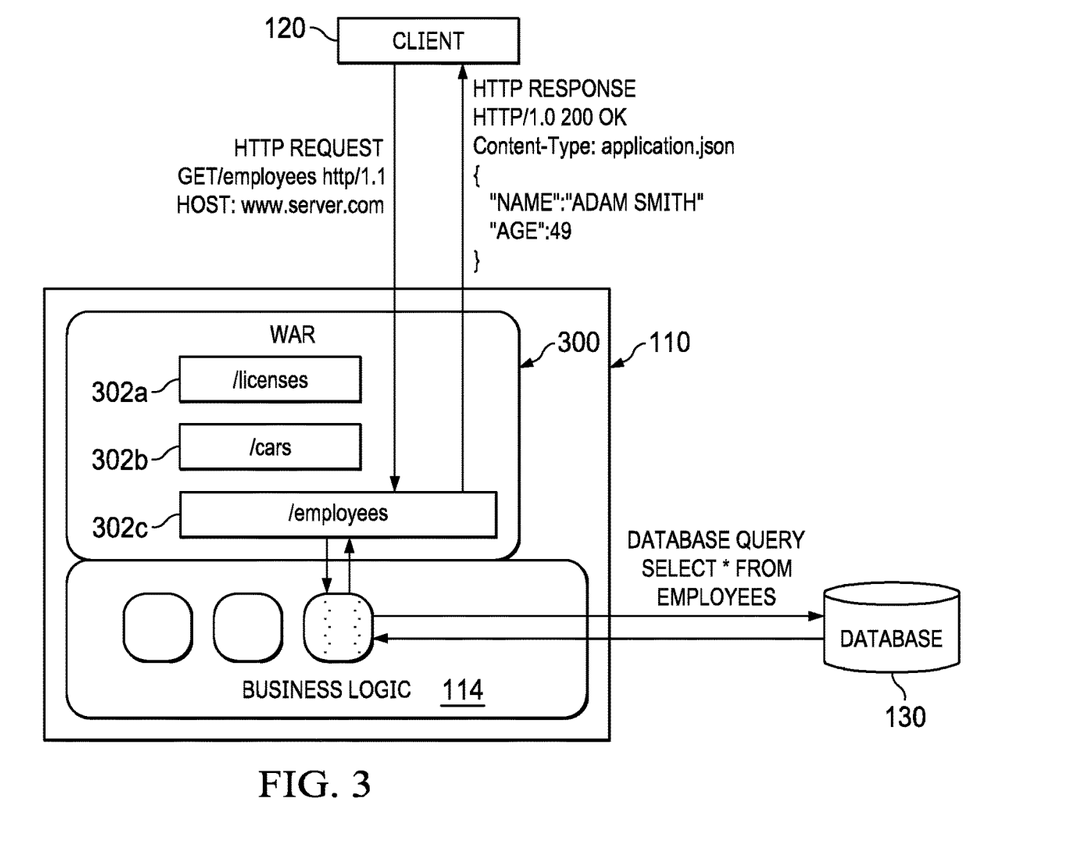
FIG. 3 illustrates an exemplary application request processing flow, according to an embodiment.

FIG. 3 illustrates an exemplary application request processing flow, according to an embodiment. An application request processing flow comprises the communications among application server 110, client 120, database 130, to generate a response to a request sent by client 120. As an example only and not by way of limitation, application server 110 hosts a car dealership application comprising a car dealership application WAR 300, car dealership application endpoints (licenses endpoint 302a, cars endpoint 302b, and employees endpoint 302c), and business logic 114 in the service layer of the application server 110. The resources which interact with each of the car dealership application endpoints 302a-302c are stored on database 130. According to embodiments, business logic 114 may be located internal to or external of one or more WARs 112a-112e, according to particular needs. For example, according to some embodiments, business logic 114 may be located on a service layer of application server 110. According to other embodiments, business logic 114 may be located internal to one or more WARs 112a-112e.

According to embodiments, an application request begins by client 120 sending a request, such as an HTTP request, to one of endpoints 302a-302c to perform an operation on a resource associated with that endpoint. For example, the application request may be sent to one of car dealership application endpoints 302a-302c and may comprise an HTTP method of the HTTP specifications to be performed on the resource associated with the endpoint 302 and a domain identifying the location of the endpoint 302 (such as, for example, a URL identifying the WAR in which the endpoint is located). According to some embodiments, however, the domain is omitted when no two endpoints of one or more endpoints 302a-302c would be mistakenly identified with each other, such as, for example, when no endpoints 302a-302c of any WAR of an application server share the same name.

To further illustrate an application request, an example is now given. In the following example and assuming, that client 120 requests a list of employees from an employee resource in database 130, client 120 may generate an HTTP request to employees endpoint 302c. By way of example and not by limitation, the HTTP request minimally comprises a location of the endpoint (employees endpoint 302c), a location of the server hosting the WAR in which the endpoint is located (www.server.com), and an HTTP method (GET) that maps to the read operation of CRUD (Create, Read, Update, and Delete) as is followed by RESTful conventions. However, according to other embodiments, the HTTP request comprises additional information, including, for example, the length of the request, whether caching is used, date, cookies, accepts, and the like. The exemplary HTTP request comprises GET, an HTTP method which maps to the read operation of CRUD. To create a resource, the HTTP request would comprise a POST HTTP method. To update a resource, the HTTP request would comprise a PUT HTTP method. To delete a resource, the HTTP request would comprise a DELETE HTTP method. Although particular HTTP methods are described as mapping to particular CRUD operations, embodiments contemplate additional HTTP verbs or methods and additional resource operations, which may be mapped to the additional HTTP verbs or methods, according to particular needs.

In response to receiving the request from client 120, employees endpoint 302c invokes business logic 114 in the service layer, which causes business logic 114 to generate a database query based on the application request. For example, the application request from client 120 comprises a GET method which indicates a request to read one or more data resources, such as the employees resource. The database SQL query based on the application request comprises "select * from employees," which indicates that the data identifying the employees in the employees resource will be copied and transmitted as a response to the query. According to some embodiments, a request will read from database 130 and perform some accompanying processing. According to other embodiments, business logic 114 may retrieve data from memory or a non-transitory computer-readable medium.

The response to the database query from database 130 is transmitted to business logic 114 of application server 110 where the response is processed, formatted, and transmitted to employees endpoint 302c. After receiving the transmitted database query, employees endpoint 302c generates an HTTP response and transmits the HTTP response to client 120. In the illustrated example, the response to the database query for the data of all employees comprises a single employee, Adam Smith, and his age, 49.

As can be seen from the application request processing flow, endpoints 302a-302c are limited to particular resources and particular communication formats. However, application communication uses a variety of formats which vary both within an industry and between industries. When a supply chain entity tries to integrate a new application with existing applications that support a supply chain system, the applications' communication formats are often different. To remedy the incompatibility of communication formats, a software provider may customize the application for the customer to alter the format of the data generated by the new application, while keeping the semantics of the data intact. However, according to embodiments disclosed herein, one or more endpoints of an application may be mapped to a component which returns data in the appropriate format without requiring modification of the application. Additional components are disclosed which provide for extending to add an additional endpoint. For example, a resource which is already present in the system, such as a resource which lists shipments, may be extended by a component to add an additional functionality, such as, for example, archiving all shipments.

An endpoint and its dependent services offers at least three distinct points of functionality: 1) ability to manipulate particular set of data, 2) API or interface offered by the endpoint such as endpoint or resource vs shipment and data format XML vs JSON, and 3) any processing capabilities that are relevant to that business and/or business model, such as the ability to calculate shipment costs, allocate inventory to an order, and the like. Overriding an endpoint could be used to change any one of these factors.

Figure 4:
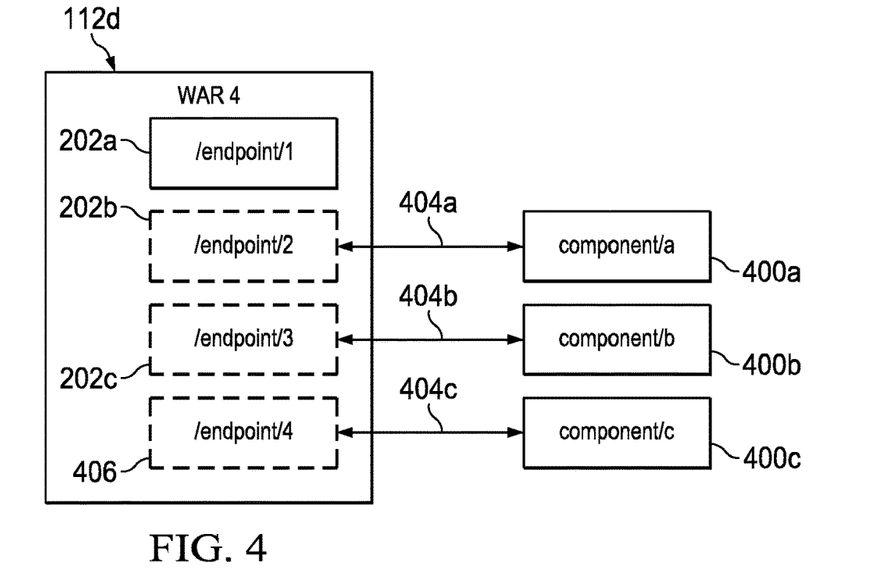
FIG. 4 illustrates the linking of components to the endpoints of the WAR4 of FIG. 1, according to an embodiment.

FIG. 4 illustrates the linking of components 400a-400c to endpoints 202a-202c of WAR4 112D of FIG. 1, according to an embodiment. Application server 110 may comprise external components 400a-400b, externalized by an execution process that maps endpoints 202b-202c of WAR4 112d to external components 400a-400b with linkings 404a-404b to execute a new functionality of an application. Additionally, WAR4 112d comprises internal component 400c, internalized by an execution process that creates a new endpoint 406 of WAR4 112d from internal component 400c to execute a new functionality of an application. According to embodiments, one or more of components 400a-400c may be located internal to or external of one or more WARs 112a-112e, according to particular needs. For example, according to some embodiments, one or more of components 400a-400c may be located on a service layer of application server 110. According to other embodiments, one or more components 400a-400c may be located internal to one or more WARs 112a-112e.

According to embodiments, component/a (component a) 400a and component/b (component b) 400b represent custom functionalities which may be based, at least in part, on resources associated with endpoint 2 202b and endpoint 3 202c, respectively, as indicated by linkings 404a-404b. Additionally, component/c (component c) 400c, when internalized, creates a new endpoint 404, which enables a custom functionality. Furthermore, components 400a-400c may be linked with any or none of endpoints 202a-202c, which, according to embodiments, does not alter the domain of WAR4 112d, but yet adds custom functionalities. Although WAR4 112d is shown and described as comprising a particular number of endpoints 202a-202c and new endpoints 406 and linking with components 400a-400c by linkings 404a-404c, embodiments contemplate any number of WARs 112 comprising any number of endpoints 202 or new endpoints 406 and linking with any number of components 400 by any number of linkings 404, according to particular needs.

Figure 5:
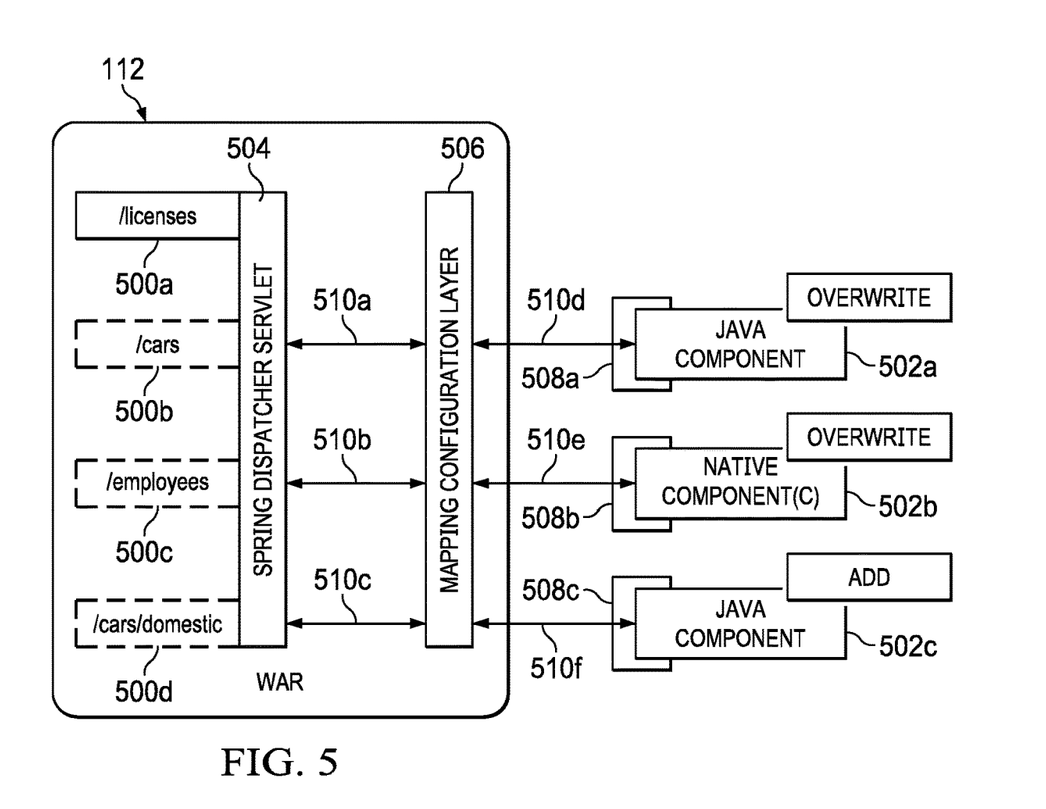
FIG. 5 illustrates the linking of components to the endpoints of an exemplary WAR, according to an embodiment.

FIG. 5 illustrates the linking of components 502a-502c to endpoints 500a-500d of exemplary WAR 112 in greater detail, according to an embodiment. As an example only and not by way of limitation, an exemplary WAR 112 represents a car dealership application and comprises endpoints 500a-500d, servlet 504, and mapping configuration layer 506. Endpoints 500a-500d invoke components 502a-502c using mapping configuration layer 506 and adapters 508a-508c. Links 510a-510f indicate mappings between endpoints 500a-500d, servlet 504, mapping configuration layer 506, adapters 508a-508c, and components 502a-502c.

According to embodiments, WAR 112 comprises endpoints 500a-500d associated with the car dealership application, including licenses endpoint 500a, cars endpoint 500b, employees endpoint 500c, and cars/domestic endpoint 500d. As discussed above, each of endpoints 500a-500d represent a feature or functionality of an application. According to embodiments, WAR 112 may also comprise servlet 504 and mapping configuration layer 506. According to embodiments, servlet 504 comprises a Spring dispatcher servlet which receives incoming requests from client 120 and distributes the requests to the appropriate destination within the application. Mapping configuration layer 506 comprises a layer which dynamically maps components 502a-502c to endpoints 500b-500d.

Components 502a-502c comprise custom functionalities that overwrite existing endpoints or map in new endpoints of an application. According to embodiments, components 502a-502c are mapped to endpoints 500a-500d using adapters 508a-508c, which comprise a thin JAVA adapter that serves as an interface between JAVA bytecode (the programming language used for WARs 112 and endpoints 202) and the various programing languages that may be used for different implementations of components 502a-502c. Even though the code underlying WARs 112 and endpoints 500a-500d are written in the JVM bytecode programming language components 502a-502c are linked to endpoints 500b-500d, the disclosed component architecture provides for components 502a-502c to not be required to be written in the JVM bytecode programming language and, instead, may comprise code written in a different programming language, such as, for example, JAVA, native code, scripting languages, and the like. Additionally, the disclosed component architecture eliminates recompiling server code or domain code (including, for example, WARs 112); however, some components 502a-502c may require compiling depending on the code and the particular implantation. For example, components 502a-502c comprising JAVA code or C-code would require compiling, while components 502a-502c comprising scripting languages, such as, for example, shell script, do not require compiling.

To further illustrate component architecture, several examples are now given in connection with exemplary WAR 112 comprising a car dealership application. Although a particular application and a particular WAR, endpoints, components and linkings is shown and described, embodiments contemplate any application and any WAR modules comprising any number of endpoints, new endpoints, components, and linkings, according to particular needs. According to a first example, cars endpoint 500b may be associated with a cars resource located on database 130 that, when requested by client 120, responds by transmitting a list of all cars in the dealership's inventory to client 120. To alter cars endpoint 500b, component 502a comprises a custom JAVA component that overwrites the original implementation of cars endpoint 500b to provide a custom functionality not present in the original application. Component 502a may, for example, replace the current cars service implementation with another implementation, including one that is written in a different programming language.

By way of a further example, employees endpoint 500c may be associated with an employees resource that, when requested by client 120, responds by transmitting a list of employees that meet particular criteria, such as, for example, all employees who work during a particular time period or the like. Component 502b may comprise a custom native code component that overwrites employees endpoint 500c to provide a custom functionality. Native code comprises the code native to the platform that runs application server 110, such as, for example, C-code or C++ code compiled for the particular platform. Unlike JAVA, native code must be compiled and targeted for the specific operating system and CPU architecture. However, embodiments of application server 110 comprise one or more adapters that map native code components directly to endpoints. While applications for supply chain entities have never previously implemented native code components for endpoint implementations without customizing the application, native code components according to disclosed embodiments is implemented without customizing the application and the process of linking components to endpoints is driven by small changes to the configuration file. This allows a supply chain entity to use native code that they may already have and tie it into an application, without recompiling application server 110. This allows one or more supply chain entities to customize their applications themselves and without access to the original source code.

By way of a third example, component 502c may comprise a custom JAVA component that adds a cars/domestic endpoint 500d to WAR 112. For example, client 120 may comprise a car dealership interface, and application server 110 comprises a service that lists an automobile inventory. To add a new inventory that lists only domestic cars (i.e. cars manufactured in the United States), the application server 110 deploys code (such as JAVA or C-code) to implement the functionality of listing domestic cars and modifies the configuration file to create a new endpoint (cars/domestic endpoint 500*d*) in WAR 112 that will create lists of only the domestic cars in inventory in the application.

According to a fourth example, endpoints 500*a*-500*d* may generate data in XML format which is incompatible with the format of other applications used in connection with the applications supporting endpoints 500*a*-500*d*. For example, the car dealership may have applications, such as an insurance application, that do not understand XML and, instead, use JSON, or the like. According to this embodiment, application server 110 deploys code comprising one or more components which overwrite endpoints 500*a*-500*d* and which transmit JSON-formatted data in response to requests, instead of the XML-formatted data sent by endpoints 500*a*-500*d* in the original implementation.

As discussed above, an application often must be modified before deployment to meet the particular business needs of different supply chain entities. To change one or more endpoints (or other parts of the application), the source code must be modified. This and other factors make changing the endpoints or modifying the application often impractical and expensive. According to embodiments, a framework provides for adding custom functionalities to an application without modifying the application. Instead, application server 110 comprises an exposure mechanism which maps endpoints 500*a*-500*d* to components 502*a*-502*c* and exposes endpoints 500*a*-500*d* as a representational state transfer (RESTful) web service.

Notably, because the functionalities of endpoints 500*a*-500*d* may be mapped to components 502*a*-502*c*, and components 502*a*-502*c* may be written in various different programming languages, embodiments of the current disclosure allow applications to be written in different programming languages. This allows different parts of the application to be written in the language best suited for that part of the application. For example, some parts of the application may be written in JAVA because it is easy to maintain and to work with. Other parts of the application may be written in C programming language, which is low level, but very fast because it runs directly on the CPU.

Further, because the changes to endpoints 500*a*-500*d* were based only on configuration changes, the original implementation of the application is still present. To return to the original implementation, the changes to the configuration which implemented the changes to the endpoints 500*a*-500*d* are undone or, alternatively, a backup copy of the configuration file for the original implantation is restored as the current configuration file. In other words, client 120 or another end user of the application may drastically change the behavior of the application (and back to earlier implementations) by modifying the endpoints through the configuration and without recompiling.

According to some embodiments, component linking may be controlled by a graphical user interface (GUI) comprising graphical elements that provide for the configuration of component linking. According to an embodiment, a component linking GUI comprises one or more toggles that alter settings associated with configuration of component linking.

According to some embodiments, configuration of component linking may be controlled by editing a configuration file, such as a flat file, by direct text editing of values for the various configurations or by automatically editing a configuration file based on user selection of configuration options and settings from a GUI associated with one or more applications. For example, embodiments contemplate a GUI displaying graphical elements representing one or more endpoints and/or components and providing for dragging the graphical elements to link one or more endpoints and components together. In response to linking of graphical elements representing the endpoints and components in the GUI, an application supporting the GUI will automatically configure component linking for system 100 in accordance with the component linking represented by the graphical elements.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
an application server comprising a processor and a memory, and comprising one or more web application archive, each of the one or more web application archive comprises one or more endpoints, wherein a domain identifying a location of each of the one or more endpoints is omitted, a servlet and a mapping configuration layer, the application server configured to:
  map the one or more endpoints to one or more functionality components;
  determine, for each endpoint of the one or more endpoints, whether a functionality of the endpoint is to be changed;
  responsive to the determination of whether an endpoint is to be changed, determine a link to a functionality component of the one or more functionality components located external to the one or more web application archive that is to replace the functionality of the endpoint, and cause the external functionality component to link to the endpoint, wherein the functionality component located external to the one or more web application archive provides functionality to the application server,
  identify a functionality component which does not link to any of one or more existing endpoints;
  receive a determination that the functionality of the functionality component which does not link to any of the one or more existing endpoints is to be included in at least one of the one or more web application archive;
  create a new endpoint in the at least one of the one or more web application archive, wherein create the new endpoint comprises modification of a configuration file and the at least one of the one or more web application archive is unchanged; and
  cause the functionality component which does not link to any of the one or more existing endpoints to link to the new endpoint.

2. The system of claim 1, wherein the programming language of the external functionality component is a different programming language than the one or more web application archive.

3. The system of claim 2, wherein the programming language of the external functionality component is native code.

4. The system of claim 1, wherein an original implementation of an application executed by the application server in accordance with the one or more web application archive and one or more endpoints replaces a current implementation of the application when the configuration file is restored to its state in the original implementation.

5. The system of claim 4, wherein the application server exposes at least one of the one or more endpoints as a representational state transfer (RESTful) web service.

6. A method, comprising:
identifying, by an application server comprising one or more web application archive, a servlet and a mapping configuration layer, an endpoint of the one or more web application archive, wherein a domain identifying a location of the endpoint is omitted;
mapping the endpoint to one or more functionality components;
determining, by the application server, whether a functionality of the endpoint is to be changed;
responsive to the determination of whether the endpoint is to be changed, determining, by the application server, a link to a functionality component of the one or more functionality components located external to the one or more web application archive that is to replace the functionality of the endpoint, and cause the external functionality component to link to the endpoint, wherein the functionality component located external to the one or more web application archive provides functionality to the application server,
identifying, by the application server, an endpoint wherein a functionality component which does not link to the endpoint;
receiving, by the application server, a determination that the functionality of the functionality component which does not link to the endpoint is to be included in at least one of the one or more web application archive;
creating, by the application server, a new endpoint in the at least one of the one or more web application archive, wherein creating the new endpoint comprises modification of a configuration file and the at least one of the one or more web application archive is unchanged; and
causing, by the application server, the functionality component which does not link to the endpoint to link to the new endpoint.

7. The method of claim 6, wherein the programming language of the external functionality component is a different programming language than the one or more web application archive.

8. The method of claim 7, wherein the programming language of the external functionality component is native code.

9. The method of claim 6, further comprising:
replacing, by the application server, a current implementation of an application when the configuration file is restored to its state in an original implementation.

10. The method of claim 9, further comprising:
exposing, by the application server, the endpoint as a representational state transfer (RESTful) web service.

11. A non-transitory computer-readable medium embodied with software, the software when executed configured to:
identify an endpoint of one or more endpoints of one or more web application archive, wherein each of the one or more web application archive comprises one or more endpoints, wherein a domain identifying a location of each of the one or more endpoints is omitted, a servlet and a mapping configuration layer;
map the one or more endpoints to one or more functionality components;
determine whether a functionality of the endpoint is to be changed;
responsive to the determination of whether the endpoint is to be changed, determine a link to a functionality component of the one or more functionality components located external to the one or more web application archive that is to replace the functionality of the endpoint, and cause the external functionality component to link to the endpoint, wherein the functionality component located external to the one or more web application archive provides functionality to the application server,
identify an endpoint wherein a functionality component which does not link to the endpoint;
receive a determination that the functionality of the functionality component which does not link to the endpoint is to be included in at least one of the one or more web application archive;
create a new endpoint in the at least one of the one or more web application archive, wherein create the new endpoint comprises a modification of a configuration file and the at least one of the one or more web application archive is unchanged; and
cause the functionality component which does not link to the endpoint to link to the new endpoint.

12. The non-transitory computer-readable medium of claim 11, wherein the programming language of the external functionality component is a different programming language than the one or more web application archive.

13. The non-transitory computer-readable medium of claim 12, wherein the programming language of the external functionality component is native code.

14. The non-transitory computer-readable medium of claim 7, wherein the software when executed is further configured to:
expose the endpoint as a representational state transfer (RESTful) web service.

* * * * *